United States Patent [19]

Smock et al.

[11] Patent Number: 4,636,595

[45] Date of Patent: Jan. 13, 1987

[54] TIMER AND MOTOR ASSEMBLY

[75] Inventors: Steven W. Smock, Indianapolis; James W. Richmond, Carmel, both of Ind.

[73] Assignee: Emhart Industries, Inc., Indianapolis, Ind.

[21] Appl. No.: 787,536

[22] Filed: Oct. 15, 1985

[51] Int. Cl.[4] .................... H01H 43/00; H02K 11/00

[52] U.S. Cl. ................................ 200/38 R; 200/38 B; 200/38 C; 310/71

[58] Field of Search ................ 200/33 R, 37 R, 37 A, 200/38 R, 38 B, 38 BA, 38 C, 38 CA, 38 D, 283, 284

[56] References Cited

U.S. PATENT DOCUMENTS 3,833,779 9/1974 Leone .............................. 200/33 R 3,845,256 10/1974 Edwards ...................... 200/38 B X 3,879,332 4/1975 Leone .............................. 200/33 R 4,130,748 12/1978 Schwer ............................ 200/38 D

*Primary Examiner*—J. R. Scott

*Attorney, Agent, or Firm*—Robert F. Meyer

[57] ABSTRACT

A timer housing has a single compartment. The cams and electrical switches, that are responsive to the cams, are carried in the compartment as well as the motor that drives the cams without any physical electrical barrier separating them. Electrical bussing bars are carried on the outer surface of the housing to provide connections of selective ones of electrical terminals that are electrically connected to the electrical switches. Electrical bussing pins electrically connect the motor to selected ones of the electrical bussing bars so as to electrically connect the motor to selected electrical terminals.

3 Claims, 4 Drawing Figures

TIMER AND MOTOR ASSEMBLY

BACKGROUND OF THE INVENTION

The present invention pertains to a timer and motor assembly and more particularly to such an assembly which is more compact, easier to manufacture, and with fewer extraneous parts.

Timing mechanisms have been used for many years to control the functions of washers, dryers, and dishwashers. Such mechanism usually includes cams, electrical switches, electrical terminals and a motor which drives the cams, usually through a gear train. The cams and electrical switches are carried in a housing with the motor and gear train carried outside the housing. With this arrangement, electrical wires are used to electrically connect the motor to selected ones of the electrical terminals, the wire being carried outside the housing. Not only does this arrangement negate the neatness and compactness of the whole assembly, but the arrangement does not lend itself to more and better automation.

FEATURES OR OBJECTS OF THE INVENTION

Accordingly, it is a feature of this invention to provide a timer and motor assembly that is more neat and compact and which lends itself to more automation in its production. Another feature of the invention is to provide a timer and motor assembly wherein the timer elements and the motor are carried in a single compartment.

SUMMARY OF THE INVENTION

In accordance with the invention, there is provided a timer and motor assembly which comprises a housing providing a single compartment, a motor assembly carried within the single compartment, cam means carried within the single compartment, coupling means coupling the motor assembly to the cam means and carried within the single compartment, switch means carried within the single compartment and biased by the cam means, and electrical terminals electrically coupled to the switch means and extending outside the housing.

The invention also contemplates the use of electrical bussing pins to electrically connect the motor to selected electrical terminals. In addition, electrical bussing bars are provided on the outer surface of the housing to enable selective electrical terminals to be electrically connected together.

DESCRIPTION OF THE INVENTION

Figure 1:
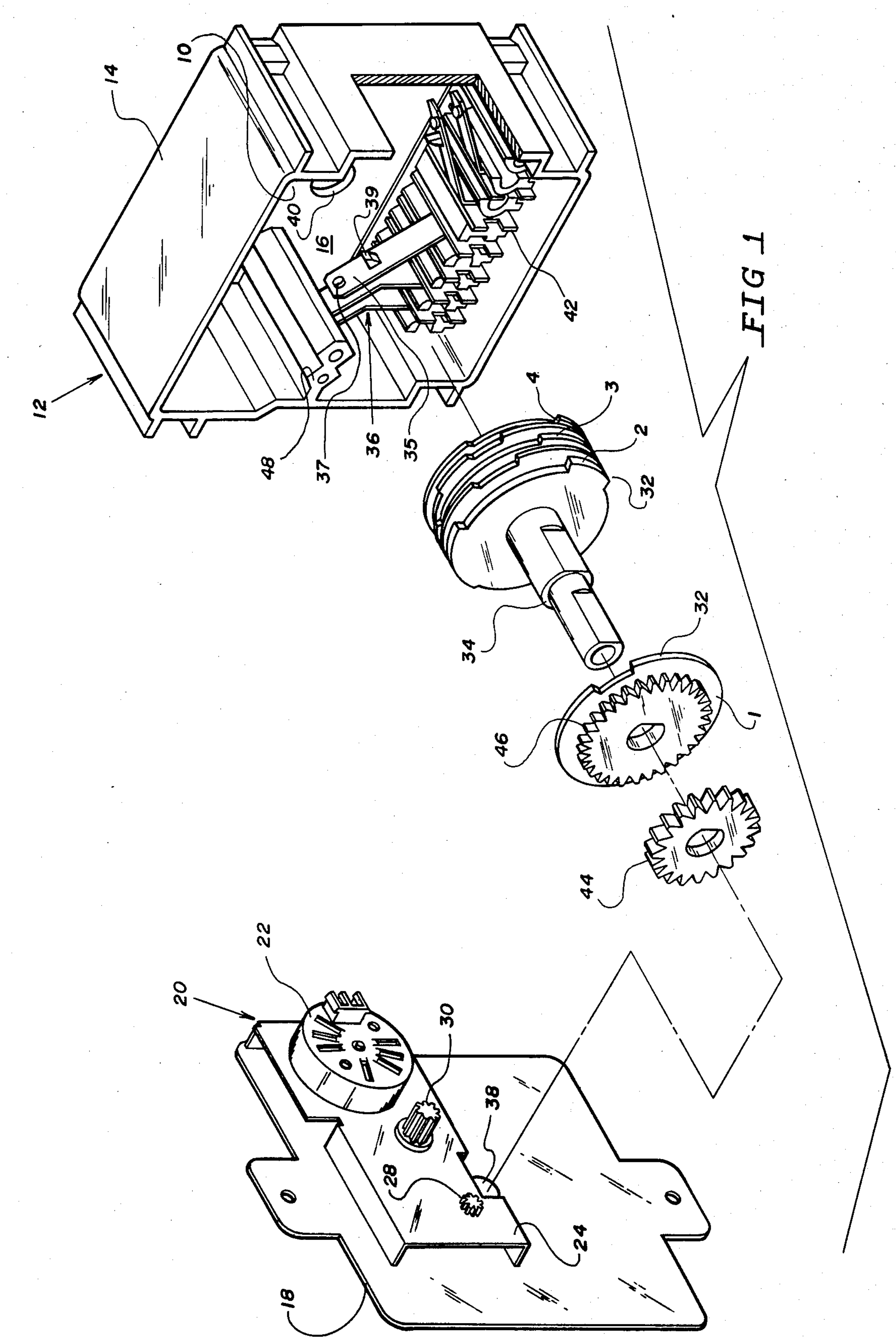
FIG. 1 is an exploded view of a timer and motor assembly employing the features of the invention.
Figure 3:
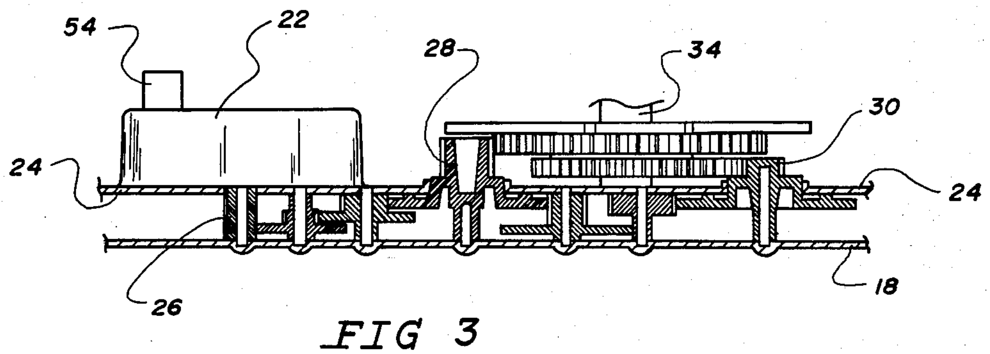
FIG. 3 is a sectional view of the motor assembly.

Referring now to FIG. 1, the timer and motor assembly is contained within a single compartment 10 formed by housing 12. Housing 12 includes a cup-shaped member 14 having a base 16 and an open end that is closed by cover plate 18. Referring to FIGS. 1 and 3, motor assembly 20 includes a synchronous motor 22 that is carried on motor plate 24 and a gear train 26 that is sandwiched between cover plate 18 and motor plate 24. Gear train 26 includes a series of gears and pinions that are connected to motor output pinion and which terminates in two output pinions 28 and 30.

The timer portion of the assembly includes a camstack 32 that is fixedly carried on shaft 34 and electrical switches 36. Electrical switches 36 include fixed and movable contact blades that engage the cams to open and close electrical contacts 37 in accordance with the program on the cams. For example, movable blade 35 has a cam follower 39 that engages one of the cams of the camstack. Shaft 34 is rotatably journalled in cover 18 through aperture 38 and in base 16 through aperture 40. Switches 36 are held in slots 42. Drive gears 44 and 46 mesh with output pinions 28 and 30, respectively. Drive gear 46 is integral with cam 1 to drive it at a certain speed while gear 44 is coupled to cams 2–4 to drive them at a different speed. A series of ledges 48 provides a means to limit the travel of some of the blades of switches 36.

It is to be understood that any type of cam and switch arrangement well known in the art may be used and that they form no part of the invention and, therefore, many details of their operation are not shown or described.

Figure 2:
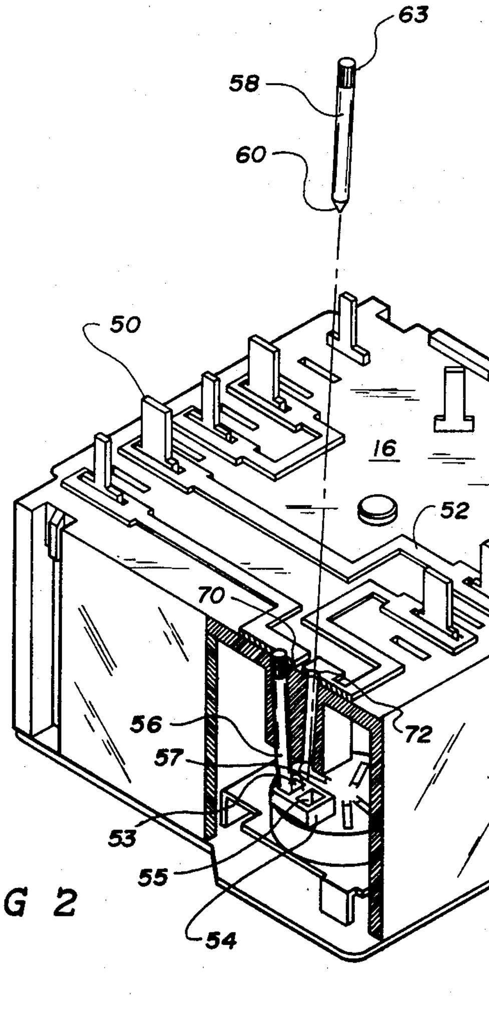
FIG. 2 is an isometric view of the assembly with a portion thereof being removed.

Referring to FIG. 2, electrical terminals 50 are integral or otherwise coupled to the contact blades of switches 36 and, as shown, they extend outside the housing. Electrical bussing bars 52 are provided on the outer surface of base 16 to electrically connect selected electrical terminals together.

Figure 4:
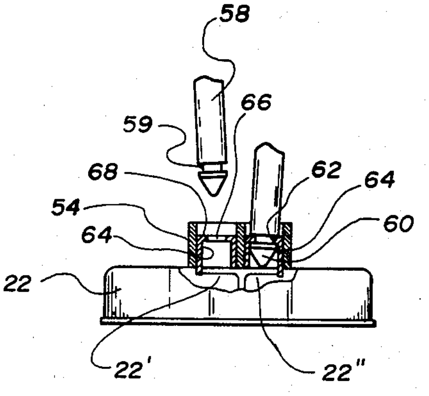
FIG. 4 is a view showing electrical bussing pins of the motor assembly.

Referring to FIGS. 2 and 4, motor 22 has a plastic terminal block 54 having compartments 53 and 55 formed by partition 57 and which are adapted to receive electrical bussing pins 56 and 58. Each of the pins include slots 59 in pointed ends 60. Carried within each of the compartments 53 and 55 is a metal frame 62 having legs 64 which extend into motor 22 to receive wires 22' and 22'. Pins 56 and 58 frictionally engage frame 62 through aperture 66 in the frame. A good electrical connection is assured when pins 58 are inserted into the frame through the slots 59 which acts as a detent in conjunction with rim 68 of the frame. Wires 22' and 22" are electrically connected to a coil of the motor.

Referring to FIG. 2, each of the pins 56 and 58 includes a knurl 63 which can be press fitted into apertures 70 and 72 to provide a good mechanical and electrical connection between the pins and bussing bars 52 to thereby electrically connect motor 22 to selected ones of electrical terminals 50.

What is claimed is:

1. A timer and motor assembly comprising a housing providing a single compartment, a motor assembly carried within said single compartment, cam means carried within said single compartment, coupling means coupling said motor assembly to said cam means and carried within said single compartment, switch means carried within said single compartment and operated by said cam means, electrical terminals electrically coupled to said switch means and extending outside said housing, electrical bussing bars carried on an outer surface of said housing and electrically connected to said electrical terminals, and electrical bussing pins extending from said motor assembly outside said housing and electrically connected to said bussing bars.

2. A timer and motor assembly according to claim 1 wherein said electrical bussing bars carried on an outer surface of said housing electrically connect selected ones of said electrical terminals.

3. A timer and motor assembly comprising a housing, a motor assembly carried within said housing, cam means carried within said housing, coupling means coupling said motor assembly to said cam means carried within said housing, switch means carried within said housing and operated by said cam means, electrical terminals electrically coupled to said switch means and extending outside said housing, and electrical bussing pins extending from said motor assembly outside said housing and electrically coupled to selected ones of said electrical terminals.

* * * * *